(12) United States Patent  
Garnsey et al.

(10) Patent No.: US 11,338,540 B2  
(45) Date of Patent: May 24, 2022

(54) DISSIPATIVE PERISTALTIC PUMP TUBING

(71) Applicant: SAINT-GOBAIN PERFORMANCE PLASTICS CORPORATION, Solon, OH (US)

(72) Inventors: Zachary Garnsey, Tallmadge, OH (US); Charles S. Golub, Westford, MA (US); Josef E. Guesman, Uniontown, OH (US); Mark Hampden-Smith, Chelmsford, MA (US); Richard Rodenbucher, Brimfield, OH (US); Carla S. Taberna, Cardiff, CA (US); Jian L. Ding, Stow, MA (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 91 days.

(21) Appl. No.: 16/863,646

(22) Filed: Apr. 30, 2020

(65) Prior Publication Data

US 2020/0346426 A1  Nov. 5, 2020

Related U.S. Application Data

(60) Provisional application No. 62/840,733, filed on Apr. 30, 2019.

(51) Int. Cl.

| | |
|---|---|
| *F16L 11/12* | (2006.01) |
| *B32B 1/08* | (2006.01) |
| *B32B 27/08* | (2006.01) |
| *F16L 9/12* | (2006.01) |

(Continued)

(52) U.S. Cl.  
CPC ........... *B32B 1/08* (2013.01); *B32B 27/08* (2013.01); *F16L 9/125* (2013.01); *F16L 9/133* (2013.01); *B32B 2250/02* (2013.01); *B32B 2307/21* (2013.01); *B32B 2597/00* (2013.01); *F16L 11/12* (2013.01); *F16L 11/127* (2013.01)

(58) Field of Classification Search  
CPC .. B32B 2597/00; B32B 2307/21; F16L 9/125; F16L 9/133; F16L 11/12; F16L 11/127  
USPC .............. 138/137, 140, 141; 428/36.9, 36.91, 428/411.1  
See application file for complete search history.

(56) References Cited

U.S. PATENT DOCUMENTS

| | | | |
|---|---|---|---|
| 4,662,514 A | 5/1987 | Berbeco | |
| 5,916,945 A * | 6/1999 | Bussi ..................... | C08K 3/04 524/427 |
| 7,041,374 B1 | 5/2006 | Nelson et al. | |

(Continued)

FOREIGN PATENT DOCUMENTS

WO    2006027647 A1    3/2006

OTHER PUBLICATIONS

International Search Report and Written Opinion for PCT/US2020/030769, dated Aug. 11, 2020, 11 pages.

*Primary Examiner* — Patrick F Brinson  
(74) *Attorney, Agent, or Firm* — Abel Schillinger, LLP; Chi Suk Kim

(57) ABSTRACT

A dissipative peristaltic pump tube includes a dissipative layer including a thermoplastic elastomer and an anti-static additive, wherein the surface resistivity of the dissipative peristaltic pump tube is at least about $10^6$ ohm/square. Further included is a peristaltic pump that includes the dissipative peristaltic pump tube.

20 Claims, 1 Drawing Sheet

(51) Int. Cl.
   *F16L 9/133*    (2006.01)
   *F16L 11/127*   (2006.01)

(56) References Cited

U.S. PATENT DOCUMENTS

| | | |
|---|---|---|
| 7,989,535 B2 | 8/2011 | Nakagawa et al. |
| 8,470,265 B2 | 6/2013 | Motadel et al. |
| 8,758,860 B1 | 6/2014 | Pyles et al. |
| 9,206,048 B2 | 12/2015 | Nakamura |
| 9,236,163 B2 | 1/2016 | Nakamura |
| 9,410,645 B2 | 8/2016 | Nakamura et al. |
| 9,804,607 B1 | 10/2017 | Coleman |
| 2002/0100516 A1 | 8/2002 | Powell et al. |
| 2002/0119272 A1* | 8/2002 | Ries ............... C08L 77/02 428/36.91 |
| 2003/0003302 A1* | 1/2003 | Fahey ............. B32B 27/36 428/411.1 |
| 2004/0191440 A1* | 9/2004 | Funaki ............ B32B 27/34 428/34.6 |
| 2005/0031818 A1* | 2/2005 | Micheneau ...... F16L 9/125 428/36.91 |
| 2005/0216075 A1 | 9/2005 | Wang et al. |
| 2006/0135668 A1 | 6/2006 | Hayes |
| 2007/0104907 A1* | 5/2007 | Nishioka ......... C08G 69/265 428/36.9 |
| 2007/0148389 A1* | 6/2007 | Nishioka ......... B32B 7/10 428/36.91 |
| 2008/0317986 A1* | 12/2008 | Schmitz .......... B32B 27/304 428/35.7 |
| 2010/0174239 A1 | 7/2010 | Yodfat et al. |
| 2010/0255323 A1* | 10/2010 | Nakamura ....... H01B 1/22 428/457 |
| 2013/0022877 A1* | 1/2013 | Lu ................... C08K 5/55 429/249 |
| 2014/0037880 A1 | 2/2014 | Siddhamalli et al. |
| 2016/0215137 A1* | 7/2016 | Cartier ............ C08L 23/00 |
| 2019/0091962 A1* | 3/2019 | Kurumiya ....... B32B 27/322 |

\* cited by examiner

DISSIPATIVE PERISTALTIC PUMP TUBING

CROSS-REFERENCE TO RELATED APPLICATION(S)

This Application claims priority under 35 U.S.C. § 119(e) to U.S. Provisional Patent Application No. 62/840,733, entitled "DISSIPATIVE PERISTALTIC PUMP TUBING," by Zachary GARNSEY et al., filed Apr. 30, 2019, which is assigned to the current assignee hereof and is incorporated herein by reference in its entirety.

FIELD OF THE DISCLOSURE

The disclosure, generally, is related to a peristaltic pump tube.

BACKGROUND

Many industries utilize peristaltic pump tubing for the delivery and removal of fluids. Since peristaltic pump tubing may be used in a variety of industries, such as the medical industry and pharmaceutical industry, thermoplastic elastomers are typically used that are non-toxic, flexible, thermally stable, have low chemical reactivity, and can be produced in a variety of sizes. With a peristaltic pump, metal rollers are in contact with the tubing. Unfortunately, an electrical charge is generated when the rollers of the peristaltic pump come in contact with the tubing. This can be problematic when medical equipment is used that is sensitive to electrical noise. For instance, when a patient is connected to an electrocardiogram and a peristaltic pump, the electrical noise from the peristaltic pump is detected by the electrocardiogram. Accordingly, medical data that are obtained must account for this electrical noise by the physician reading the results. In fact, physicians are trained to account for the electrical noise when reading the results of an electrocardiogram if a patient is connected to a peristaltic pump. It would be advantageous, however, to decrease this electrical noise so a more accurate reading can be achieved.

Accordingly, an improved tube that would at least decrease the electrical charge generated by the rollers on the tubing is desired.

SUMMARY

In an embodiment, a dissipative peristaltic pump tube includes a dissipative layer including a thermoplastic elastomer and an anti-static additive, wherein the surface resistivity of the dissipative peristaltic pump tube is at least about $10^6$ ohm/square.

In another embodiment, a peristaltic pump includes a dissipative peristaltic pump tube including a dissipative layer including a thermoplastic elastomer and an anti-static additive, wherein the surface resistivity of the dissipative peristaltic pump tube is at least about $10^6$ ohm/square.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
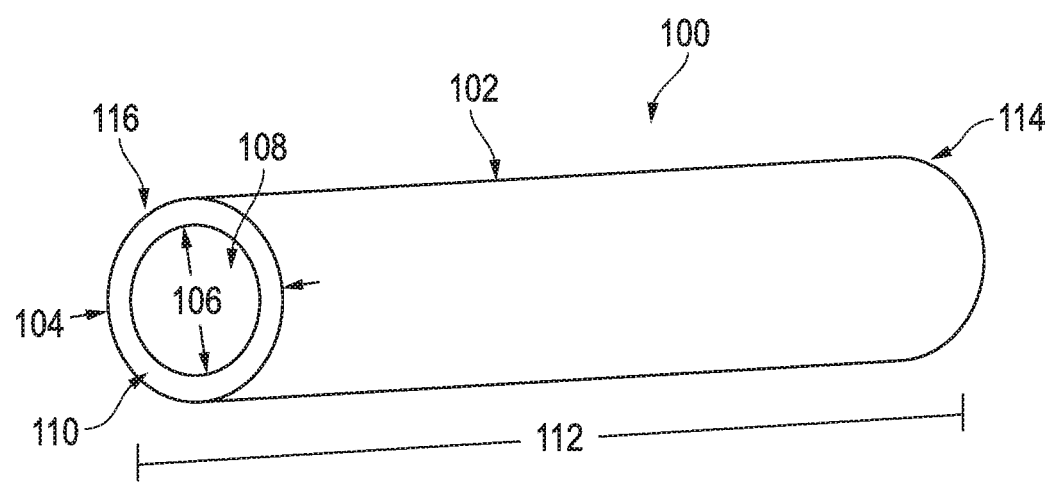
FIGS. 1 and 2 include illustrations of exemplary dissipative peristaltic pump tubes.

The following description in combination with the figures is provided to assist in understanding the teachings disclosed herein. The following discussion focuses on specific implementations and embodiments of the teachings. This focus is provided to assist in describing the teachings and should not be interpreted as a limitation on the scope or applicability of the teachings.

As used herein, the terms "comprises", "comprising", "includes", "including", "has", "having", or any other variation thereof, are open-ended terms and should be interpreted to mean "including, but not limited to. . . . " These terms encompass the more restrictive terms "consisting essentially of" and "consisting of." In an embodiment, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in reference books and other sources within the structural arts and corresponding manufacturing arts. Unless indicated otherwise, all measurements are at about 25° C. For instance, values for viscosity are at 25° C., unless indicated otherwise.

The disclosure generally relates to a tube, and in particular, to a dissipative peristaltic pump tube. The dissipative peristaltic pump tube includes a dissipative layer including a thermoplastic elastomer and an anti-static additive. "Dissipative" in reference to the dissipative peristaltic pump tube and the dissipative layer as used herein refers to at least statically dissipative. In an embodiment, the dissipative peristaltic pump tube and the dissipative layer is electrically dissipative. The dissipative peristaltic pump tube has desirable surface resistivity, particular when in contact with rollers of a peristaltic pump, such that the dissipative peristaltic pump tube has a decreased electrical charge compared to a peristaltic pump tube without an anti-static additive. In an embodiment, the dissipative peristaltic pump tube has a surface resistivity that is at least about $10^6$ ohm/square. "Surface resistivity" as used herein is defined as a resistance of leakage of current along an outside surface of the tube.

In an embodiment, the dissipative peristaltic pump tube includes a dissipative layer of the thermoplastic elastomer and the anti-static additive. Any thermoplastic elastomer is envisioned. In a particular embodiment, the thermoplastic elastomer includes a polystyrene, a polyester, a silicone copolymer, silicone thermoplastic vulcanizate, a copolyester, a polyamide, a fluoropolymer, a polyethylene, a polypropylene, a polyether-ester copolymer, a thermoplastic urethane, a polyether amide block (PEBA) copolymer, a polyamide copolymer, a styrene block copolymer, a polycarbonate, a polyolefin elastomer, a thermoplastic vulcanizate, an ionomer, a polyoxymethylene (POM), an acrylonitrile butadiene styrene (ABS), an acetal, an acrylic, a polyvinyl chloride (PVC), a blend, or combination thereof. In a more particular embodiment, the thermoplastic polymer is a polyvinyl chloride, polyurethane, PEBA, styrene block copolymer, a blend, or combination thereof. The thermoplastic elastomer provides a matrix for the anti-static additive to be homogeneously dispersed therein.

An anti-static additive provides at least static dissipative properties, or even electrically dissipative properties, to the dissipative layer. In an embodiment, any anti-static additive is envisioned. Any reasonable amount of the anti-static additive is envisioned to provide at least static dissipative properties, or even electrically dissipative properties, to the dissipative peristaltic pump tube. For instance, the anti-static additive includes an inherently dissipative additive, a liquid additive, a conductive additive, or combination thereof. Any inherently dissipative additive is envisioned. In an embodiment, the inherently dissipative additive includes, but is not limited to, polyether block amide (PEBA), a urethane block copolymer, or combination thereof. In an example, the inherently dissipative additive is present at an amount of about 1% to about 90% of the total weight of the dissipative layer. In an embodiment, the anti-static additive is a liquid additive including, but not limited to, stearic acid, ethoxylated amine, a diethanolamide, a glycerol monostearate, glycerol ester, alkyl sulphonate, ethoxylated fatty acid ester, ethoxylated, sorbitan ester, zinc stearate, or combination thereof. In an embodiment, the liquid additive is present at an amount of about 0.1% to about 35% of the total weight of the dissipative layer. In an embodiment, the anti-static additive may be any reasonable conductive additive. Exemplary conductive additives include, but are not limited to, an onium salt, carbon black, silver ion, silver metal, a quaternary ammonium salt, gold, gold alloy, copper, copper alloy, or combination thereof. In a particular embodiment, the onium salt includes a nitrogen-based onium salt. In an embodiment, the conductive additive is present at an amount of about 0.05% to about 15% of the total weight of the dissipative layer. It will be appreciated that the amounts of the anti-static additive can be within a range between any of the minimum and maximum values noted above. In an embodiment, a combination of the anti-static agent is envisioned that provides synergy such that relatively low amounts of the additives may be used to provide a desirable surface resistivity.

The thermoplastic elastomer may be formed with any reasonable component such as any precursor with the addition of any reasonable additive. An additional additive includes, for instance, a catalyst, a filler, a plasticizer, a lubricant, an antioxidant, a colorant, an optically transparent conductive additive, an adhesion promoter, heat stabilizer, acid scavenger, UV stabilizer, processing aid, or combination thereof. In a particular embodiment, the precursor, the additional additive such as the catalyst, the filler, plasticizer, lubricant, antioxidant, colorant, an optically transparent conductive additive, an adhesion promoter, heat stabilizer, acid scavenger, UV stabilizer, processing aid, or combination thereof are dependent upon the thermoplastic elastomer chosen and final properties desired for the dissipative peristaltic pump tube.

Any reasonable catalyst that can initiate crosslinking of the thermoplastic elastomer is envisioned. Exemplary catalysts include a catalyst that may be heat cured, IR radiation cured, e-beam cured, or combination thereof, such as a peroxide, a benzophenone, or combination thereof. The catalyst may or may not be used in combination with a crosslinker promoter, such as triallyl cyanurate (TAC), triallyl isocyanurate (TAIL), or combination thereof. In an embodiment, the additive includes any reasonable optically transparent conductive additive. An exemplary optically transparent conductive additive includes, but is not limited to, an indium tin oxide particle, a silver nanowire, a carbon nanotube, or combination thereof. In an embodiment, the additive includes any reasonable adhesion promoter. Any reasonable adhesion promoter that promotes adhesion of adjacent layers is envisioned and is dependent upon the adjacent layers. Exemplary lubricants include silicone oil, waxes, slip aids, antiblock agents, the like, or any combination thereof. Exemplary lubricants further include silicone grafted polyolefin, polyethylene or polypropylene waxes, Oleic acid amide, erucamide, stearate, fatty acid esters, the like, or any combination thereof. Exemplary antioxidants include phenolic, hindered amine antioxidants. Exemplary fillers include calcium carbonate, talc, radio-opaque fillers such as barium sulfate, bismuth oxychloride, any combinations thereof, and the like. Exemplary plasticizers include any known plasticizers such as a citrate, a phthalate, a trimellitate, 1,2-cyclohexane dicarboxylic acid diisonoyl ester (DINCH), an adipate, a polymeric plasticizer, a castor oil, a caster oil derivative, mineral oils, soybean oil, such as epoxidized soybean oil, the like, or any combination thereof.

Typically, the additional additive may be present at an amount of not greater than about 50% by weight of the total weight of the thermoplastic elastomer, such as not greater than about 40% by weight of the total weight of the thermoplastic elastomer, or even not greater than about 30% by weight of the total weight of the thermoplastic elastomer. In an alternative embodiment, the thermoplastic elastomer may be substantially free of an additional additive such as a catalyst, lubricant, a filler, a plasticizer, an antioxidant, a colorant, an optically transparent conductive additive, an adhesion promoter, heat stabilizer, acid scavenger, UV stabilizer, processing aid, or combination thereof.

In an embodiment, the material content of the dissipative layer is essentially 100% thermoplastic elastomer and anti-static agent. In some embodiments, the dissipative layer consists essentially of the respective thermoplastic elastomer and anti-static additive described above. As used herein, the phrase "consists essentially of" used in connection with the layer precludes the presence of materials that affect the basic and novel characteristics of the thermoplastic elastomer, although, commonly used processing agents and additional additives may be used in the layer.

FIG. 1 is a view of a dissipative peristaltic pump tube 100 according to an embodiment. In a particular embodiment, the dissipative peristaltic pump tube 100 can include a body 102 having an outside diameter 104 and an inner diameter 106. The inner diameter 106 can form a hollow bore 108 of the body 102. The hollow bore 108 defines a central lumen of the tube. In addition, the body 102 is illustrated as a dissipative layer, the dissipative layer including the thermoplastic elastomer and the anti-static additive. The dissipative layer can include a layer thickness 110 that is measured by the difference between the outside diameter 104 and the inner diameter 106.

In a particular embodiment, the outside diameter 104 of the body 102 is about 0.25 inches to about 5.0 inches, such as about 0.5 inches to about 2.0 inches. It will be appreciated that the outside diameter 104 can be within a range between any of the minimum and maximum values noted above. In an embodiment, the inner diameter 106 of the body 102 is about 0.03 inches to about 4.0 inches, such as about 0.06 inches to about 1.0 inches. It will be appreciated that the inner diameter 106 can be within a range between any of the minimum and maximum values noted above.

Further, the body 102 can have a length 112, which is a distance between a distal end 114 and a proximal end 116 of the dissipative peristaltic pump tube 100. In a further embodiment, the length 112 of the body 102 can be at least about 2 meters, such as at least about 5 meters, such as at least about 10 meters. The length 112 is generally limited by pragmatic concerns, such as storing and transporting long lengths, or by customer demand.

Although the cross-section of the hollow bore 108 perpendicular to an axial direction of the body 102 in the illustrative embodiment shown in FIG. 1 has a circular shape, the cross-section of the hollow bore 108 perpendicular to the axial direction of the body 102 can have any cross-section shape envisioned.

Figure 2:
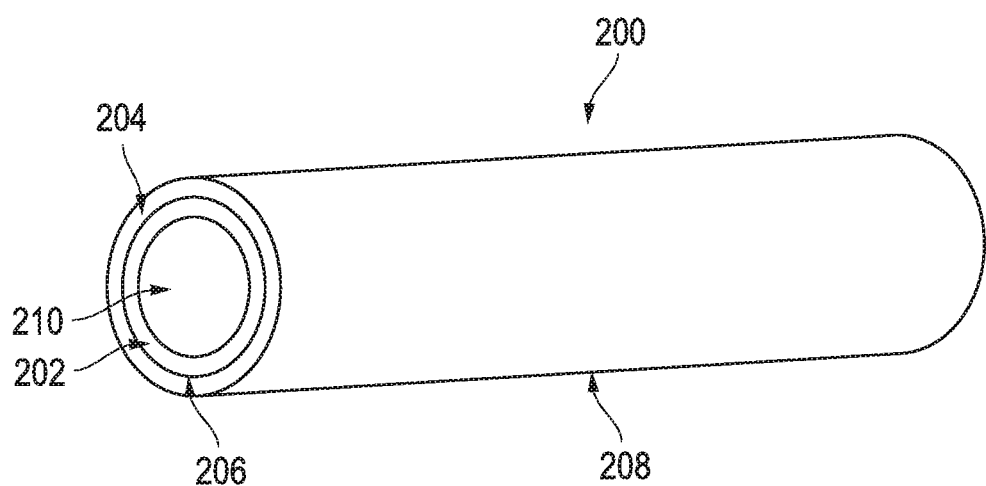

In an alternative embodiment and as seen in FIG. 2, a dissipative peristaltic pump tube 200 is an elongated annular structure with a hollow central bore. The dissipative peristaltic pump 200 includes an inner layer 202 and a dissipative layer 204. The dissipative layer 204 is illustrated as a coating overlying the inner layer 202. The inner layer 202 may be directly in contact with and may directly bond to the dissipative layer 204 along an outer surface 206 of the inner layer 202. As illustrated, the dissipative layer 204 provides an outside surface 208 of the dissipative peristaltic pump tube 200. For example, the inner layer 202 may directly bond to the dissipative layer 204 without intervening adhesive layers, such as a primer. In an exemplary embodiment, the dissipative peristaltic pump tube 200 includes two layers, i.e. such as the inner layer 202 and the dissipative layer 204. As illustrated, the inner layer 202 includes an inner surface 210 that defines a central lumen of the tube. In an embodiment, the dissipative layer 204 includes the thermoplastic elastomer and the anti-static agent. In an embodiment, the inner layer 202 may be the same or different material than the dissipative layer 204. For instance, the inner layer 202 may include the same or different thermoplastic elastomer as the dissipative layer 204 and may or may not include an anti-static additive. In an example, the inner layer 202 is an exemplary thermoplastic elastomer as described above with or without an anti-static additive. In an embodiment, the inner layer 202 includes an anti-static additive to provide at least static dissipative properties, or even electrically dissipative properties, to the peristaltic pump tube. In an alternative embodiment, the inner layer 202 does not include an anti-static additive.

Any dimensions of the dissipative peristaltic pump tube 200 are envisioned. For instance, any thickness of the layers 202, 204 is envisioned and is typically dependent upon the final properties desired for the dissipative peristaltic pump tube 200. In an embodiment, the ratio of the thickness of the inner layer 202 to the dissipative layer 204 may be 20:1 to 1:20, such as 10:1 to 1:10. It will be appreciated that the ratio of the thickness can be within a range between any of the minimum and maximum values noted above.

Although illustrated as a single layer tube and a two layer tube, any number of layers is envisioned. For instance, the dissipative peristaltic pump tube includes one layer, two layers, three layers, or even a greater number of layers. Typically, the dissipative layer has a thickness of at least about 0.002 inches to about 0.060 inches. It will be appreciated that the thickness of the dissipative layer can be within a range between any of the minimum and maximum values noted above. Irrespective of the number of layers present, the outside diameter and inner diameter of the dissipative peristaltic pump tube can have any values as defined for the single layer tube 100 defined in FIG. 1. The number of layers is dependent upon the final properties desired for the dissipative peristaltic pump tube.

In an embodiment, the dissipative peristaltic pump tube may further include other layers. Other layers include, for example, a polymeric layer, a reinforcing layer, an adhesive layer, a barrier layer, a chemically resistant layer, a metal layer, any combination thereof, and the like. Any reasonable method of providing any additional layer is envisioned and is dependent upon the material chosen. For instance, the additional layer may be an additional polymeric layer of a thermoplastic elastomer that may or may not be extruded. In an embodiment, any number of polymeric layers is envisioned. Any number of dissipative layers is also envisioned. Further, although FIG. 1 and FIG. 2 illustrate the dissipative layer as either having an inner surface that defines a central lumen of the tube or being an outer surface of the tube, respectively, the dissipative layer can be disposed in any location of a multi-layer tube, such as sandwiched between multiple layers.

In an embodiment, the dissipative layer of the dissipative peristaltic pump tube may be formed by any reasonable means, such as extrusion or injection molding. In a particular embodiment, the layer of the dissipative peristaltic pump tube is formed via extrusion. Any reasonable extrusion system is envisioned. The extrusion system typically includes a pumping system and can include a number of devices that can be utilized to form at least one layer of the dissipative peristaltic pump tube. For example, the pumping system can include a pumping device such as a gear pump, a static mixer, an extruder, a tube die, a radiation cure device, a post-processing device, or any combination thereof. In an embodiment, the thermoplastic elastomer and anti-static additive may be melt processed by dry blending or compounding. The dry blend may be in powder, granular, or pellet form. In a particular embodiment, to form the dissipative layer of the dissipative peristaltic pump tube, pellets of the corresponding monomer or polymer may be compounded with the anti-static additive through a co-rotating intermeshing twin-screw extruder, cooled by a water bath, and cut into compound pellets. The dissipative layer may be made by a continuous compounding process or batch related process. The resulting pellets of the blend are fed into an extruder with a tube die. The tube is extruded through the tube die, the tube having an inner surface that defines a central lumen of the tube.

In an embodiment, the thermoplastic elastomer of the dissipative layer is cured. Any cure conditions are envisioned, such as radiation cure, thermal cure, or combination thereof. In a particular embodiment, the radiation source is sufficient to substantially cure the thermoplastic material. "Substantially cure" as used herein refers to >90% of final crosslinking density, as determined for instance by rheometer data (90% cure means the material reaches 90% of the maximum torque as measured by ASTM D5289). Any reasonable radiation source is envisioned such as actinic radiation. In an embodiment, the radiation source is ultraviolet light (UV). In a particular embodiment, curing the thermoplastic material includes irradiating with ultraviolet energy with a wavelength of about 10 nanometers (nm) to about 410 nm. Further, any number of applications of radiation energy may be applied with the same or different wavelengths. Any thermal cure conditions are envisioned and depend on the thermoplastic elastomer chosen.

When the dissipative peristaltic pump tube includes multiple layers, each of the individual layers of the dissipative peristaltic pump tube may be formed by any reasonable means and is dependent upon the material and the configured location of each of the individual layers. In an example, the inner layer of a thermoplastic elastomer is provided with the dissipative layer formed thereon, as seen in FIG. 2. Typically, the thermoplastic elastomer is provided by any reasonable means such as extrusion or injection molding as described for the dissipative layer. The thermoplastic elastomer is formed into a layer, such as an inner layer of the dissipative peristaltic pump tube.

After the inner layer is formed, the inner layer may be surface treated on an outer surface that is adjacent to the dissipative layer. In a particular embodiment, the inner layer is surface treated prior to forming the dissipative layer over the inner layer. The surface treatment is to increase the adhesion of the inner layer to the dissipative layer when the inner layer is in direct contact with the dissipative layer. In an embodiment, the surface treatment enables adhesion between the two layers to provide cohesive bonding, i.e. cohesive failure occurs wherein the structural integrity of the inner layer and/or the dissipative layer fails before the bond between the two materials fails. The surface treatment may include radiation treatment, chemical etch, physical-mechanical etch, plasma etch, corona treatment, chemical vapor deposition, or any combinations thereof. In an embodiment, the outer surface of the inner layer is free of any surface treatment. In an embodiment, the adhesion between the inner layer and the dissipative layer may be improved through the use of an adhesive layer, such as a primer. In an alternative embodiment, the surface between the inner layer and the dissipative layer are free of a primer.

In an embodiment, the dissipative layer is formed by an extrusion system as described, which may be the same or different than the extrusion system used for the first layer. For instance, when the inner layer has the inner surface that defines a central lumen of the tube, the dissipative layer is extruded over the inner layer. In an embodiment, a crosshead die is used to allow extrusion of at least one layer over an adjacent layer.

Although the dissipative layer is described in this embodiment as being delivered after the inner layer is provided, any order of delivery of the inner layer and delivery of the dissipative layer is envisioned. In an embodiment, the inner layer and the dissipative layer may be co-extruded.

Once formed, the dissipative peristaltic pump tube advantageously can withstand a sterilization process. In an embodiment, the dissipative peristaltic pump tube is sterilized by any method envisioned. Exemplary sterilization methods include steam, gamma, ethylene oxide, E-beam techniques, combinations thereof, and the like. In a particular embodiment, the dissipative peristaltic pump tube is sterilized by steam sterilization. In an exemplary embodiment, the dissipative peristaltic pump tube is heat-resistant to steam sterilization at temperatures up to about 121° C. for a time of up to about 30 minutes. In an embodiment, the dissipative peristaltic pump tube is heat resistant to steam sterilization at temperatures of up to about 135° C. for a time of up to about 20 minutes. In an embodiment, the dissipative peristaltic pump tube may be sterilized via gamma sterilization of up to about 50 kGy.

The present embodiments can produce a dissipative peristaltic pump tube having desirable properties. In particular, the dissipative peristaltic pump tube has less electrical charge compared to a tube without an anti-static agent. In an embodiment, the dissipative peristaltic pump tube has desirable surface resistivity of at least about $10^6$ ohm/square, such as at about $10^6$ ohm/square to about $10^{12}$ ohm/square. With the desirable surface resistivity, the electrical charge and electrical noise created is substantially decreased when a peristaltic pump tube is contacted by peristaltic pump rollers. In addition, the medical data obtained when the peristaltic pump tube is used in combination with an electrocardiogram is more accurate compared to when a tube without an anti-static agent is used. Further, the addition of the anti-static agent provides a desirable volume resistivity of the dissipative peristaltic pump tube compared to a tube without an anti-static agent. "Volume resistivity" is defined as a resistance to leakage of a current through the thickness of the body, i.e. through an inner surface to an outer surface, of the tube. In an embodiment, the dissipative peristaltic pump tube has desirable volume resistivity of at least about $10^6$ ohm/square, such as at about $10^6$ ohm/square to about $10^{12}$ ohm/square.

In a particular embodiment, the resulting dissipative peristaltic pump tube has desirable flexibility, substantial clarity or translucency, flow reduction, and the like. Flexibility of the final dissipative peristaltic pump tube is typically with a shore A of about 25 to about 90, such as about 35 to about 80 as measured by ASTM D2250. Clarity of the dissipative peristaltic pump tube is checked visually and classified into four levels in terms of transparency: clear, translucent, hazy, and opaque. In an embodiment, the dissipative peristaltic pump tube is not opaque and may be clear or translucent. In a particular embodiment, the dissipative peristaltic pump tube is clear. In an embodiment, the dissipative peristaltic pump tube has a light transmission greater than about 1%, such as greater than about 20%, or even greater than about 50% in the visible light wavelength range. In an exemplary embodiment, the dissipative peristaltic pump tube may have an average flow reduction of less than about 50% of the initial starting value in water.

In exemplary embodiments, the dissipative peristaltic pump tube can be used in a variety of applications. Applications for the dissipative peristaltic pump tube are numerous. In particular, the non-toxic nature of the dissipative peristaltic pump tube makes the dissipative peristaltic pump tube useful for any application where toxicity is undesired. For instance, the dissipative peristaltic pump tube has potential for FDA, ADCF, USP Class VI, NSF, European Pharmacopoeia compliant, United States Pharmacopoeia (USP) compliant, USP physiochemical compliant, ISO 10993 Standard for evaluating biocompatibility of a medical device, and other regulatory approvals. In a particular embodiment, the dissipative peristaltic pump tube is non-cytotoxic, non-hemolytic, non-pyrogenic, animal-derived component-free, non-mutagenic, non-bacteriostatic, non-fungistatic, or any combination thereof.

In an embodiment, the dissipative peristaltic pump tube may be used in applications such as industrial, medical applications, health care, biopharmaceutical, drinking water, food & beverage applications, dairy applications, laboratory applications, FDA applications, and the like. In an exemplary embodiment, the dissipative peristaltic pump tube may be used in applications such as a fluid transfer tube in food and beverage processing equipment, a fluid transfer tube in medical and health care, biopharmaceutical manufacturing equipment, and peristaltic pump tube for medical, laboratory, and biopharmaceutical applications. In a particular embodiment, the dissipative peristaltic pump tube may be used in a peristaltic pump in combination with an electrocardiogram.

In a particular embodiment, a fluid source, such as a container, reactor, reservoir, tank, or bag, is coupled to a dissipative peristaltic pump tube. The dissipative peristaltic pump tube may engage a pump, fitting, valve, dispenser, or another container, reactor, reservoir, tank, or bag. In an example, the dissipative peristaltic pump tube may be coupled to a water container and may have a dispenser fitting on the distal end. In another example, the dissipative peristaltic pump tube may be coupled to a fluid bag and coupled to a valve at the distal end. In a further example, the dissipative peristaltic pump tube may be coupled to a container, be engaged in a pump, and be coupled to a second container at a distal end.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the items as listed below.

Embodiment 1

A dissipative peristaltic pump tube includes a dissipative layer including a thermoplastic elastomer and an anti-static additive, wherein the surface resistivity of the dissipative peristaltic pump tube is at least about $10^6$ ohm/square.

Embodiment 2

A peristaltic pump includes a dissipative peristaltic pump tube including a dissipative layer including a thermoplastic elastomer and an anti-static additive, wherein the surface resistivity of the dissipative peristaltic pump tube is at least about $10^6$ ohm/square.

Embodiment 3

The dissipative peristaltic pump tube of any of the preceding embodiments, wherein the anti-static additive includes an inherently dissipative additive, a liquid additive, a conductive additive, or combination thereof.

Embodiment 4

The dissipative peristaltic pump tube of embodiment 3, wherein the conductive additive includes onium salt, carbon black, silver ion, silver metal, a quaternary ammonium salt, gold, gold alloy, copper, copper alloy, or combination thereof.

Embodiment 5

The dissipative peristaltic pump tube of embodiment 4, wherein the onium salt comprises a nitrogen-based onium salt.

Embodiment 6

The dissipative peristaltic pump tube of embodiment 4, wherein the conductive additive is present at an amount of about 0.05% to about 15% of the total weight of the dissipative layer.

Embodiment 7

The dissipative peristaltic pump tube of embodiment 3, wherein the inherently dissipative additive includes polyether block amide (PEBA), a urethane block copolymer, or combination thereof.

Embodiment 8

The dissipative peristaltic pump tube of embodiment 7, wherein the inherently dissipative additive is present at an amount of about 1% to about 90% of the total weight of the dissipative layer.

Embodiment 9

The dissipative peristaltic pump tube of embodiment 3, wherein the liquid additive includes stearic acid, ethoxylated amine, a diethanolamide, a glycerol monostearate, glycerol ester, alkyl sulphonate, ethoxylated fatty acid ester, ethoxylated, sorbitan ester, zinc stearate, or combination thereof.

Embodiment 10

The dissipative peristaltic pump tube of embodiment 9, wherein the liquid additive is present at an amount of about 0.1% to about 35% of the total weight of the dissipative layer.

Embodiment 11

The dissipative peristaltic pump tube of any of the preceding embodiments, wherein the thermoplastic elastomer includes a polystyrene, a polyester, a silicone copolymer, silicone thermoplastic vulcanizate, a copolyester, a polyamide, a fluoropolymer, a polyethylene, a polypropylene, a polyether-ester copolymer, a thermoplastic urethane, a polyether amide block (PEBA) copolymer, a polyamide copolymer, a styrene block copolymer, a polycarbonate, a polyolefin elastomer, a thermoplastic vulcanizate, an ionomer, a polyoxymethylene (POM), an acrylonitrile butadiene styrene (ABS), an acetal, an acrylic, a polyvinyl chloride (PVC), a blend, or combination thereof.

Embodiment 12

The dissipative peristaltic pump tube of embodiment 11, wherein the thermoplastic elastomer includes a polyvinyl chloride, polyurethane, PEBA, a styrene block copolymer, a blend, or combination thereof.

Embodiment 13

The dissipative peristaltic pump tube of any of the preceding embodiments, wherein the dissipative layer has an inner surface that defines a central lumen of the tube.

Embodiment 14

The dissipative peristaltic pump tube of any of the preceding embodiments, wherein the dissipative layer is a coating layer on an outer surface of an inner layer.

Embodiment 15

The dissipative peristaltic pump tube of any of the preceding embodiments, having a shore A durometer of about 25 to about 90, such as about 35 to about 80.

Embodiment 16

The dissipative peristaltic pump tube of any of the preceding embodiments, wherein the dissipative layer has a thickness of at least about 0.002 inches to about 0.060 inches.

Embodiment 17

The dissipative peristaltic pump tube of any of the preceding embodiments, wherein the tube has an inner diameter of about 0.03 inches to about 4.0 inches, such as about 0.06 inches to about 1.0 inches.

Embodiment 18

The dissipative peristaltic pump tube of any of the preceding embodiments, wherein the tube has an outside diameter of about 0.25 inches to about 5.0 inches, such as about 0.5 inches to about 2.0 inches.

Embodiment 19

The dissipative peristaltic pump tube of any of the preceding embodiments, wherein the tube has a length of at least about 2 meters, such as at least about 5 meters, such as at least about 10 meters.

Embodiment 20

The dissipative peristaltic pump tube of any of the preceding embodiments, having biocompatibility and animal derived component free formulation ingredients.

Embodiment 21

The dissipative peristaltic pump tube of any of the preceding embodiments, wherein the tube is used for biopharmaceutical applications, FDA applications, medical applications, laboratory applications, or combination thereof.

Embodiment 22

The dissipative peristaltic pump tube of embodiment 21, wherein the tube is used in combination with an electrocardiogram.

Embodiment 23

The dissipative peristaltic pump tube of any of the preceding embodiments, wherein tube has less electrical charge compared to a tube without an anti-static agent.

Embodiment 24

The dissipative peristaltic pump tube of any of the preceding embodiments, having a flow reduction of less than about 50% of the initial starting value.

Embodiment 25

The dissipative peristaltic pump tube of any of the preceding embodiments, further including an optically transparent conductive additive.

Embodiment 26

The dissipative peristaltic pump tube of embodiment 25, wherein the optically transparent conductive additive includes an indium tin oxide particle, a silver nanowire, a carbon nanotube, or combination thereof.

Embodiment 27

The dissipative peristaltic pump tube of any of the preceding embodiments, having a light transmission greater than about 1% in the visible light wavelength range.

Embodiment 28

The dissipative peristaltic pump tube of any of the preceding embodiments, wherein the dissipative peristaltic pump tubing has a surface resistivity of at least about $10^6$ ohm/square, such as at about $10^6$ ohm/square to about $10^{12}$ ohm/square.

The concepts described herein will be further described in the following examples, which do not limit the scope of the disclosure described in the claims. The following examples are provided to better disclose and teach processes and compositions of the present invention. They are for illustrative purposes only, and it must be acknowledged that minor variations and changes can be made without materially affecting the spirit and scope of the invention as recited in the claims that follow.

EXAMPLES

Example 1

Several materials are tested for Surface Resistivity. Samples of polyvinyl chloride (PVC) are tested with differing amounts of an anti-static additive added as a Masterbatch based on the total weight % of the dissipative layer. The anti-static additive includes a conductive additive of onium salt at up to 10% weight of the Masterbatch. The dissipative layer is a coating (i.e. jacket) overlying an inner PVC layer (without any anti-static additive). All testing for surface resistivity and surface resistance is at 21° C. using ASTM D257. Electrode configuration includes placing two stainless steel rings 10 mm apart on a section of tubing with 500 volts applied. Results and testing conditions can be seen in Table 1. "% RH" is percent relative humidity.

TABLE 1

| Material | % RH | Surface resistance | Surface resistivity (ohm/sq) |
|---|---|---|---|
| 55 shore A flexible PVC tube | 25 | 1.76E+12 | 5.23E+12 |
| 0.008" jacket consisting of 20% Masterbatch in tube form | 25 | 1.55E+10 | 4.61E+10 |
| 0.015" jacket consisting of 85% Masterbatch in tube form | 26 | 3.21E+08 | 9.6E+08 |
| 0.015" jacket consisting of 65% Masterbatch in tube form | 26 | 8.17E+08 | 2.4E+09 |
| 0.008" jacket consisting of 15% Masterbatch in tube form | 26 | 2.63E+10 | 7.8E+10 |
| 0.015" jacket consisting of 15% Masterbatch in tube form | 26 | 1.84E+10 | 5.5E+10 |
| 0.015" jacket consisting of 20% Masterbatch in tube form | 26 | 8.13E+09 | 2.4E+10 |

As seen in Table 1, the addition of the anti-static additive to the thermoplastic elastomer improves the static dissipative properties of the material compared to the control.

The materials are also tested for Volume Resistivity. All testing for volume resistivity is using ASTM D257. Electrode configuration includes placing a 4.0 cm stainless steel sleeve (electrode 1) and two stainless steel guard rings (electrode 2) on outside diameter (OD) of the tube. A conductive rod is inserted (electrode 3) through the inside diameter (ID) of tube with 500 volts applied. Results and testing conditions can be seen in Table 2. "% RH" is percent relative humidity.

TABLE 2

| Material | Temp (° C.) | % RH | Measured Current (A) | Volume Resistivity (ohm cm) |
|---|---|---|---|---|
| Control Sample (55 shore A flexible PVC) Tube | 20 | 24 | 2.35E−08 | 2.13E+10 |
| 0.008" jacket consisting of 20% Masterbatch in tube form | 20 | 24 | 4.52E−08 | 1.11E+10 |
| 0.015" jacket consisting of 85% Masterbatch in tube form | 20 | 24 | 5.57E−08 | 9.0E+09 |
| 0.015" jacket consisting of 65% Masterbatch in tube form | 21 | 31 | 4.86E−08 | 1.0E+10 |
| 0.008" jacket consisting of 15% Masterbatch in tube form | 21 | 31 | 4.26E−08 | 1.2E+10 |
| 0.015" jacket consisting of 15% Masterbatch in tube form | 21 | 31 | 3.13E−08 | 1.6E+10 |
| 0.015" jacket consisting of 20% Masterbatch in tube form | 21 | 31 | 3.25E−08 | 1.5E+10 |

Volume resistivity is desirable for the resulting tube with a dissipative coating.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A dissipative peristaltic pump tube comprises a dissipative layer comprising a thermoplastic elastomer and an anti-static additive, wherein a surface resistivity of the dissipative peristaltic pump tube is at least about $10^6$ ohm/square and wherein the dissipative layer provides an outside surface of the dissipative peristaltic pump tube.

2. The dissipative peristaltic pump tube of claim 1, wherein the anti-static additive comprises an inherently dissipative additive, a liquid additive, a conductive additive, or combination thereof.

3. The dissipative peristaltic pump tube of claim 2, wherein the conductive additive comprises onium salt, carbon black, silver ion, silver metal, a quaternary ammonium salt, gold, gold alloy, copper, copper alloy, or combination thereof.

4. The dissipative peristaltic pump tube of claim 3, wherein the conductive additive is present at an amount of about 0.05% to about 15% of the total weight of the dissipative layer.

5. The dissipative peristaltic pump tube of claim 2, wherein the inherently dissipative additive comprises polyether block amide (PEBA), a urethane block copolymer, or combination thereof.

6. The dissipative peristaltic pump tube of claim 5, wherein the inherently dissipative additive is present at an amount of about 1% to about 90% of the total weight of the dissipative layer.

7. The dissipative peristaltic pump tube of claim 2, wherein the liquid additive comprises stearic acid, ethoxylated amine, a diethanolamide, a glycerol monostearate, glycerol ester, alkyl sulphonate, ethoxylated fatty acid ester, ethoxylated, sorbitan ester, zinc stearate, or combination thereof.

8. The dissipative peristaltic pump tube of claim 7, wherein the liquid additive is present at an amount of about 0.1% to about 35% of the total weight of the dissipative layer.

9. The dissipative peristaltic pump tube of claim 1, wherein the thermoplastic elastomer comprises a polystyrene, a polyester, a silicone copolymer, silicone thermoplastic vulcanizate, a copolyester, a polyamide, a fluoropolymer, a polyethylene, a polypropylene, a polyether-ester copolymer, a thermoplastic urethane, a polyether amide block (PEBA) copolymer, a polyamide copolymer, a styrene block copolymer, a polycarbonate, a polyolefin elastomer, a thermoplastic vulcanizate, an ionomer, a polyoxymethylene (POM), an acrylonitrile butadiene styrene (ABS), an acetal, an acrylic, a polyvinyl chloride (PVC), a blend, or combination thereof.

10. The dissipative peristaltic pump tube of claim 9, wherein the thermoplastic elastomer comprises a polyvinyl chloride, polyurethane, PEBA, styrene block copolymer, a blend, or combination thereof.

11. The dissipative peristaltic pump tube of claim 1, wherein the dissipative layer has an inner surface that defines a central lumen of the tube.

12. The dissipative peristaltic pump tube of claim 1, wherein the dissipative layer is a coating on an outer surface of an inner layer.

13. The dissipative peristaltic pump tube of claim 1, wherein the tube is used in combination with an electrocardiogram.

14. The dissipative peristaltic pump tube of claim 1, wherein tube has less electrical charge compared to a tube without an anti-static agent.

15. The dissipative peristaltic pump tube of claim 1, having a flow reduction of less than about 50% of an initial starting value.

16. The dissipative peristaltic pump tube of claim 1, further comprising an optically transparent conductive additive.

17. The dissipative peristaltic pump tube of claim 16, wherein the optically transparent conductive additive comprises an indium tin oxide particle, a silver nanowire, a carbon nanotube, or combination thereof.

18. The dissipative peristaltic pump tube of claim 1, having a light transmission greater than about 1% in the visible light wavelength range.

19. The dissipative peristaltic pump tube of claim 1, wherein the dissipative peristaltic pump tubing has a surface resistivity of at least about $10^6$ ohm/square, such as at about $10^6$ ohm/square to about $10^{12}$ ohm/square.

20. A peristaltic pump comprises:
a dissipative peristaltic pump tube comprising a dissipative layer comprising a thermoplastic elastomer and an anti-static additive, wherein a surface resistivity of the dissipative peristaltic pump tube is at least about $10^6$ ohm/square and wherein the dissipative layer provides an outside surface of the dissipative peristaltic pump tube.

* * * * *